(12) United States Patent
Swaby

(10) Patent No.: US 11,486,581 B2
(45) Date of Patent: Nov. 1, 2022

(54) FUEL NOZZLE AND ASSOCIATED METHOD OF ASSEMBLY

(71) Applicant: PRATT & WHITNEY CANADA CORP., Longueuil (CA)

(72) Inventor: Nadia Swaby, York (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/035,974

(22) Filed: Sep. 29, 2020

(65) Prior Publication Data

US 2022/0099026 A1    Mar. 31, 2022

(51) Int. Cl.
*F23R 3/28* (2006.01)
*F02C 7/22* (2006.01)
*F23R 3/34* (2006.01)

(52) U.S. Cl.
CPC .............. *F23R 3/283* (2013.01); *F23R 3/286* (2013.01); *F02C 7/222* (2013.01); *F05D 2240/35* (2013.01); *F23R 3/346* (2013.01)

(58) Field of Classification Search
CPC .. F23R 3/28; F23R 3/283; F23R 3/286; F23R 3/30; F23R 3/32; F23D 14/48; F23D 14/64
See application file for complete search history.

(56) References Cited

U.S. PATENT DOCUMENTS

| | | | | |
|---|---|---|---|---|
| 4,999,996 A * | 3/1991 | Duchene | ................. | F23R 3/283 60/740 |
| 5,117,624 A * | 6/1992 | Roberts, Jr | ............. | F23R 3/283 60/740 |
| 5,222,358 A * | 6/1993 | Chaput | ................... | F23R 3/283 60/740 |
| 5,247,790 A * | 9/1993 | Donlan | ................... | F23D 11/38 60/800 |
| 5,328,101 A * | 7/1994 | Munshi | ................... | F16L 13/14 239/600 |
| 5,419,115 A * | 5/1995 | Butler | ....................... | F23R 3/10 60/804 |
| 5,524,438 A * | 6/1996 | Johnson | ................... | F23R 3/10 60/747 |
| 5,533,330 A * | 7/1996 | Mullooly | ............... | F23R 3/283 60/39.821 |

(Continued)

FOREIGN PATENT DOCUMENTS

| | | |
|---|---|---|
| GB | 1547770 | 6/1979 |
| WO | 2019223848 | 11/2019 |

*Primary Examiner* — William H Rodriguez
(74) *Attorney, Agent, or Firm* — Norton Rose Fulbright Canada LLP

(57) ABSTRACT

The fuel nozzle can have a proximal member having a first mating portion defined around an assembly axis, a first fluid conduit internal to the proximal member and spaced apart from the assembly axis, and a first stop facing a first circumferential direction; and a distal member having a second mating portion configured for axial engagement with the first mating portion along the assembly axis, a second stop facing a second circumferential direction, the second circumferential direction opposite the first circumferential direction and configured to abut against the first stop when the distal member and proximal member are axially engaged to one another in a predetermined relative circumferential alignment.

16 Claims, 4 Drawing Sheets

(56) References Cited

U.S. PATENT DOCUMENTS

| | | | |
|---|---|---|---|
| 5,816,041 A | 10/1998 | Greninger | |
| 7,628,019 B2* | 12/2009 | Tanner | F23C 5/02 239/399 |
| 8,291,706 B2* | 10/2012 | Tanner | F23C 5/02 60/740 |
| 8,726,667 B2* | 5/2014 | Tanner | F23C 5/02 60/740 |
| 2006/0130483 A1* | 6/2006 | Howell | F23R 3/283 60/748 |
| 2006/0207258 A1* | 9/2006 | Tanner | F16L 27/08 60/740 |
| 2007/0193273 A1* | 8/2007 | DeVane | F23R 3/002 60/752 |
| 2007/0199329 A1* | 8/2007 | Hernandez | F23R 3/283 60/746 |
| 2008/0282703 A1* | 11/2008 | Morenko | F23R 3/002 60/752 |
| 2010/0089065 A1* | 4/2010 | Tuthill | F23D 11/38 60/737 |
| 2010/0170267 A1* | 7/2010 | Boettcher | F23R 3/283 60/796 |
| 2011/0197588 A1 | 8/2011 | Khosla et al. | |
| 2012/0036857 A1* | 2/2012 | Bassani | F23R 3/60 60/752 |
| 2012/0104119 A1 | 5/2012 | Benalikhoudja | |
| 2012/0198653 A1* | 8/2012 | Tanner | F23C 5/02 16/2.1 |
| 2013/0341912 A1* | 12/2013 | Tanner | F23R 3/283 285/272 |
| 2015/0292743 A1* | 10/2015 | Mook | F23R 3/283 60/806 |
| 2015/0345789 A1* | 12/2015 | Papple | F23R 3/10 60/772 |
| 2017/0003028 A1* | 1/2017 | Pireyer | F16B 21/04 |
| 2017/0067638 A1* | 3/2017 | Le Pannerer | F23R 3/283 |
| 2018/0306437 A1* | 10/2018 | Gunderson | F23R 3/28 |
| 2019/0086088 A1* | 3/2019 | Stevens | F23R 3/50 |
| 2019/0309949 A1* | 10/2019 | Prociw | F23R 3/283 |
| 2019/0346142 A1* | 11/2019 | Cires | F23R 3/60 |
| 2019/0368420 A1* | 12/2019 | Myatlev | F02C 7/22 |
| 2019/0376690 A1* | 12/2019 | Niemeyer | F23R 3/286 |
| 2020/0011533 A1 | 1/2020 | Ramotowski et al. | |
| 2020/0132305 A1* | 4/2020 | Ryon | F01N 3/2033 |
| 2020/0248904 A1* | 8/2020 | Oskooei | F23D 11/24 |
| 2021/0048196 A1* | 2/2021 | Snyder | F23R 3/14 |
| 2021/0172605 A1* | 6/2021 | Snyder | F23R 3/286 |

* cited by examiner

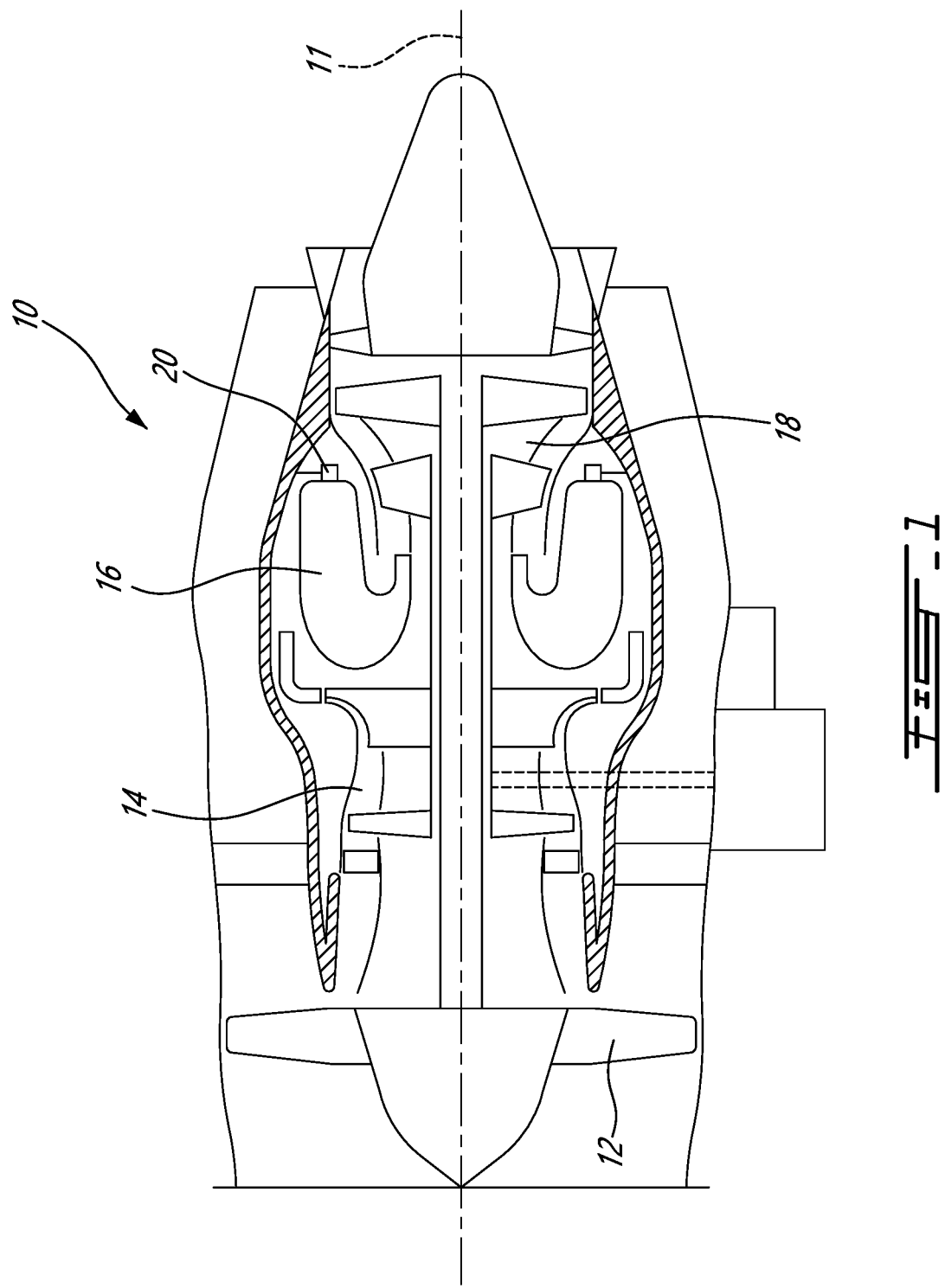

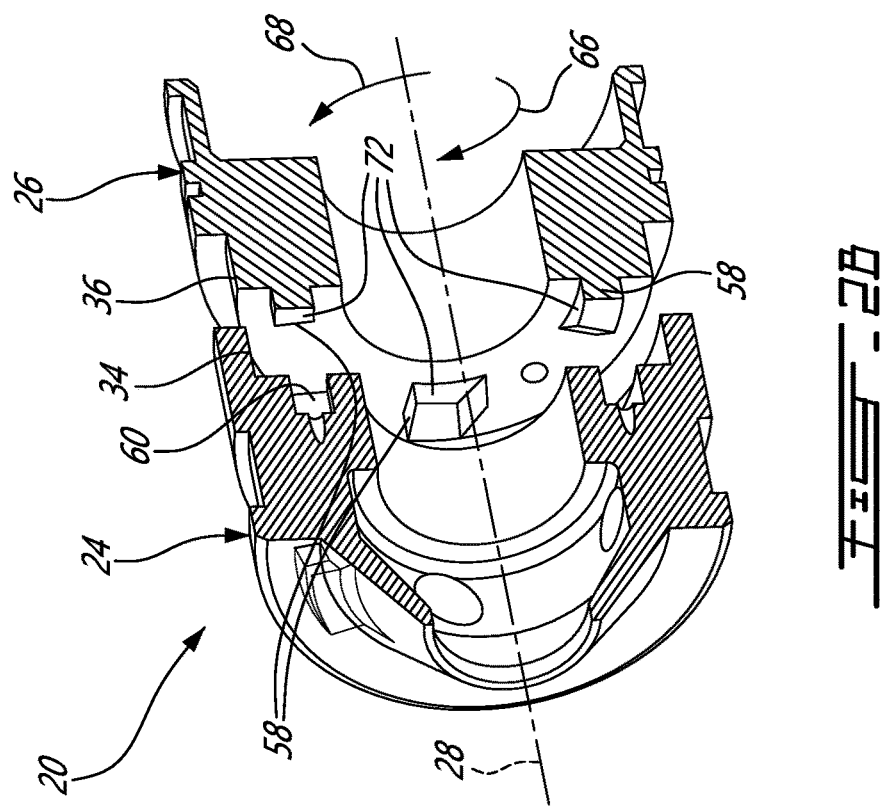
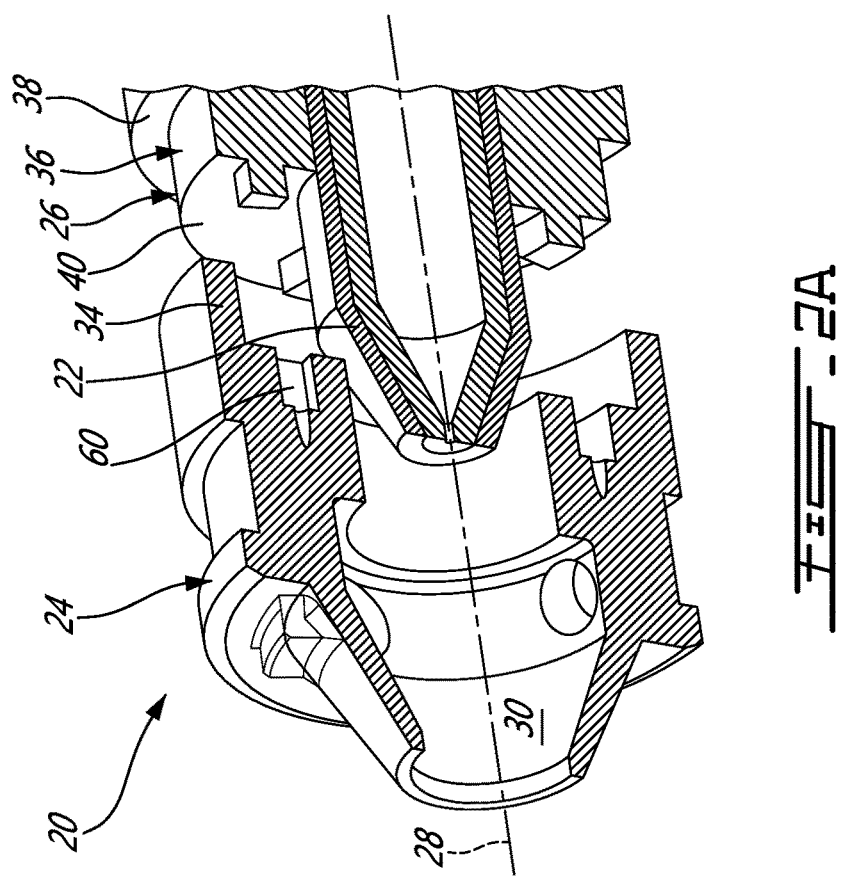

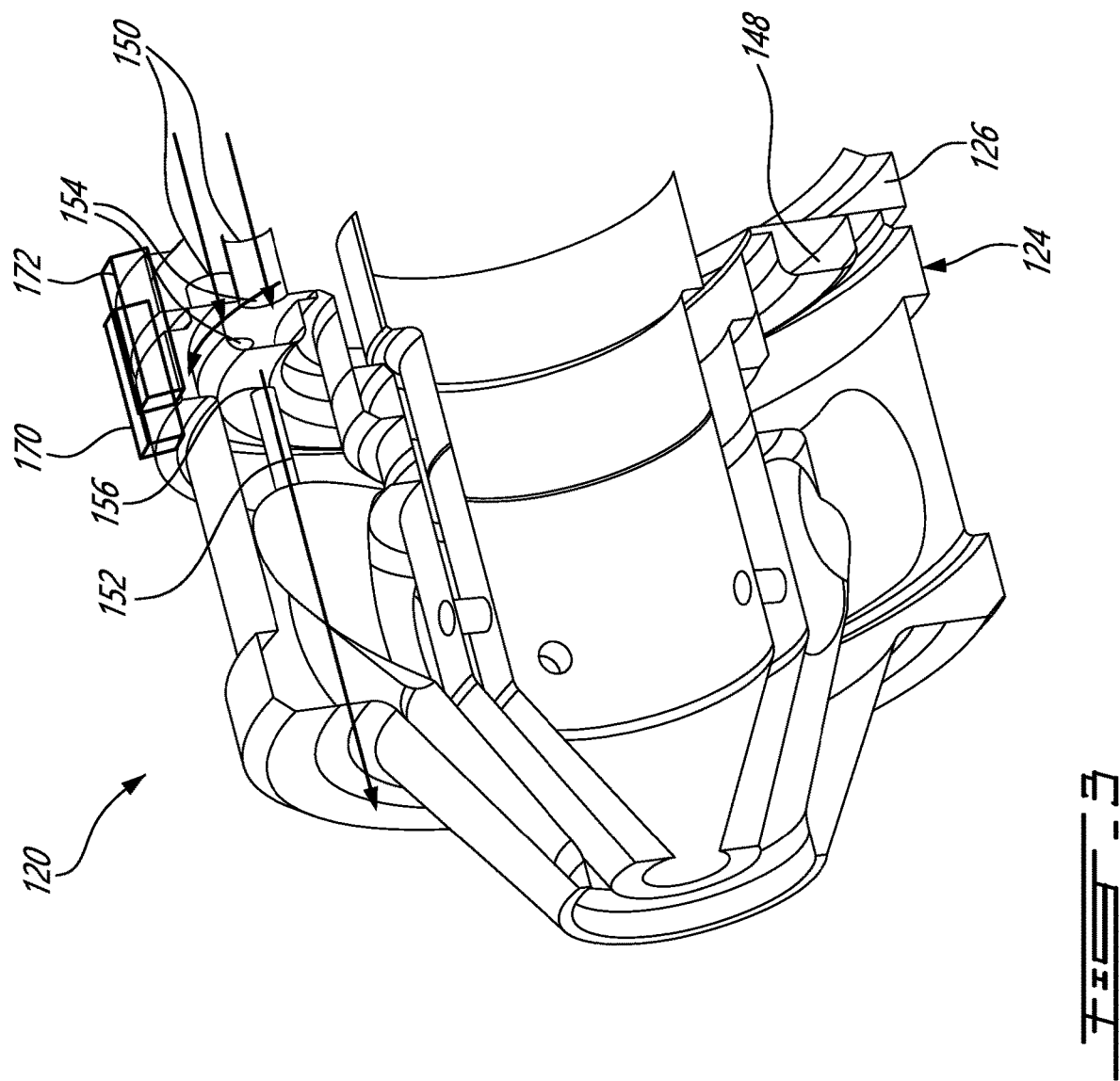

FUEL NOZZLE AND ASSOCIATED METHOD OF ASSEMBLY

TECHNICAL FIELD

The application relates generally to gas turbine engines and, more particularly, to fuel nozzle assemblies.

BACKGROUND OF THE ART

Fuel nozzles have one (or more) fuel conduit which conveys the fuel from a fuel line to a fuel outlet across a body of the fuel nozzle. Some fuel nozzles are provided in the form of assemblies, i.e. are made of two components which are assembled to one another. In such assemblies, the fuel conduit can have one portion, or segment, in each one of the components, and to be designed in a manner for the fuel conduit portions to become connected when the components are assembled to one another. Several reasons may motivate such a two component fuel nozzle assembly, an example of which can be achieving a sufficiently small diameter of the fuel conduit at a sufficient length, as smaller diameter holes cannot be drilled as deep as larger diameter holes.

Although former fuel nozzle assemblies have been satisfactory to a certain degree, there always remains room for improvement. For instance, the high temperature environment in which fuel nozzles operate can be susceptible to coking of fuel within the fuel conduits, which may eventually restrict fuel flow, and represent a maintenance burden. There can thus be a need for reducing the likelihood or occurrences of coking, or otherwise improving the evolution of fuel flow dynamics therein.

SUMMARY

In one aspect, there is provided a fuel nozzle comprising: a proximal member having a first mating portion defined around an assembly axis, a first fluid conduit internal to the proximal member and spaced apart from the assembly axis, and a first stop facing a first circumferential direction; and a distal member having a second mating portion configured for axial engagement with the first mating portion along the assembly axis, a second stop facing a second circumferential direction, the second circumferential direction opposite the first circumferential direction and configured to abut against the first stop when the distal member and proximal member are axially engaged to one another in a predetermined relative circumferential alignment, a second fluid conduit internal to the distal member and spaced apart from the assembly axis, the second fluid conduit being in fluid flow communication with the first fluid conduit internally to the fuel nozzle when the second stop abuts the first stop.

In another aspect, there is provided a method of assembling a fuel nozzle, the method comprising axially engaging a first mating portion forming part of a proximal member to a second mating portion forming part of a distal member and positioning a first stop forming part of the proximal member into circumferential abutment with a second stop forming part of the distal member, thereby establishing a fluid flow communication between at least one first fluid conduit extending across the proximal member and a second fluid conduit extending across the distal member.

In a further aspect, there is provided a gas turbine engine having an annular gas path extending subsequently across, a compressor stage, a combustion stage, and a turbine stage, the combustion stage including a plurality of circumferentially interspaced combustion chamber units, each combustion chamber unit having a fuel nozzle, at least one of said fuel nozzles having a proximal member having a first mating portion defined around an assembly axis, a first fluid conduit internal to the proximal member and spaced apart from the assembly axis, and a first stop facing a first circumferential direction; a distal member having a second mating portion configured for axial engagement with the first mating portion along the assembly axis, a second stop facing a second circumferential direction, the second circumferential direction opposite the first circumferential direction and configured to abut against the first stop when the distal member and proximal member are axially engaged to one another in a predetermined relative circumferential alignment, a second fluid conduit internal to the distal member and spaced apart from the assembly axis, the second fluid conduit being in fluid flow communication with the first fluid conduit internally to the fuel nozzle when the second stop abuts the first stop.

DESCRIPTION OF THE DRAWINGS

Reference is now made to the accompanying figures in which:

FIG. 1 is a schematic cross-sectional view of a gas turbine engine;

FIG. 2A is an oblique cross-sectional view of an example of a fuel nozzle, in accordance with an embodiment;

FIG. 2B is another oblique cross-sectional view of the example fuel nozzle of FIG. 1, with an internal component removed;

FIG. 3 is an oblique cross-sectional view of another example of a fuel nozzle, in accordance with another embodiment.

DETAILED DESCRIPTION

Figure 2D:
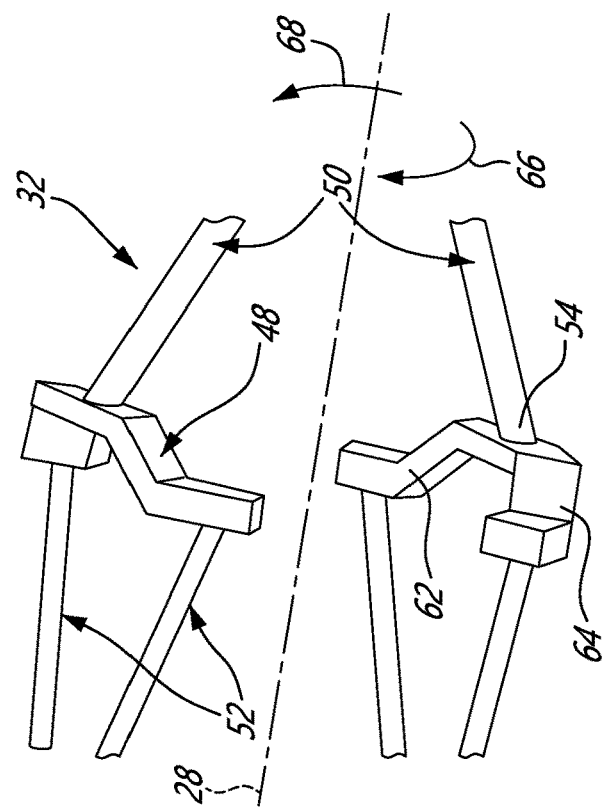
FIG. 2D is a negative view of the embodiment of FIGS. 2B and 2C, where internal passages are shown as solids and solids are shown as voids.
Figure 2C:
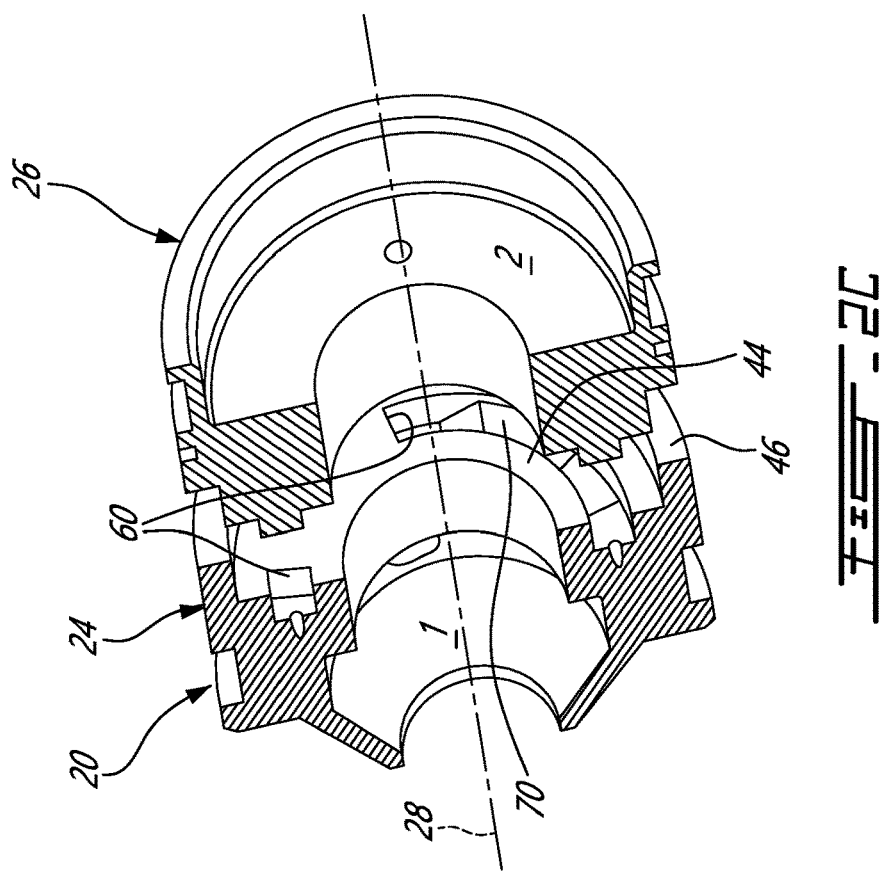
FIG. 2C is a view similar to the view of FIG. 2B, but taken from another angle.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The combustor 16 can include a plurality of circumferentially interspaced combustor units, or combustor chambers, each having an apertured liner for introduction of the compressed air, and one or more fuel nozzle 20 for injecting the fuel therein.

An example fuel nozzle 20 in accordance with one embodiment is presented in FIGS. 2A-2D. The fuel nozzle 20 can be qualified as a fuel nozzle assembly in the sense that it is formed from the assembly of a plurality of individual components, including a central jet assembly 22, a proximal member 26, and a distal member 24. As will be presented in greater detail below, in this embodiment, the proximal member 26 and the distal member 24 are components having a generally annular geometry extending around an assembly axis 28, and which are configured to be axially engaged to one another. In this embodiment, a central aperture 30 and a fluid conduit network 32 (best seen in FIG. 2D) are present in the components 24, 26 when assembled.

The axial aperture 30 is configured to receive the central jet assembly 22. The fluid conduit network 32 has a number of fluid conduits each radially spaced apart from the axis.

It will be understood that this specific example fuel nozzle design is provided solely for the purpose of presenting one possible embodiment, and alternate designs can significantly depart from such a specific configuration. For instance, in an alternate embodiment, the central jet assembly 22, instead of being provided in the form of a distinct component, may be integrated into the proximal member and distal member, the assembly can be formed of more than two axially engageable/stackable components, such as having a third member in addition to the proximal and distal members, and the stackable components can have shapes other than generally annular, such as other generally axisymmetric shapes or even outer geometries not axisymmetric at all, such as prism shaped, to name some possible examples. The expression proximal and distal are used here not in the sense of imparting meaning into the corresponding member, but simply for ease of reference and allowing to easily distinguish one of the stackable components from the other. The expression proximal can refer, for instance, to the component which is closer to the attachment point on the combustion chamber liner, and the expression distal can refer to a component which penetrates into the combustion chamber and leading to or incorporating the tip. The proximal member can be a support member secured directly to the combustion chamber liner, or yet another member can be used to form a support component, between the proximal member and the combustion chamber liner. The distal member can be a tip member penetrating the deepest into the combustion chamber, or can be used to receive yet another component which will penetrate deeper into the combustion chamber, to name some examples.

Referring back to the embodiment illustrated, it will be noted that both the proximal member 26 and the distal member 24 have axially mating portions 36, 34. In this embodiment, the axially mating portion 36 of the proximal member 26 is a male mating portion, and the axially mating portion 34 of the distal member 24 is a female member, but it will be understood that this configuration can be inversed in alternate embodiments, such as by providing a proximal member with a female mating portion, and the distal member with a male mating member. For ease of reference within this text, the mating portion of the proximal member 26 can be arbitrarily identified to as the first mating portion 36 and the mating portion of the distal member 24 can arbitrarily be identified as the second mating portion 34.

More specifically, in the embodiment illustrated, the first mating portion 36 has a radially outer-facing cylindrical wall, and the second mating portion 34 has a radially inner-facing cylindrical wall having a diameter closely matching the diameter of the radially outer-facing cylindrical wall, in a manner that the radially outer-facing cylindrical wall can be snugly concentrically engaged within the radially inner-facing cylindrical wall, with limited radial play, or perhaps even interference, therebetween. Once axially engaged to one another, the proximal member 26 can be secured to the distal member 24, such as by welding, brazing, gluing, or fastening, to name some examples, and in some cases, it can be considered suitable to engage the mating portions 34, 36 by interference-fitting, for example, which can be another way of securing the proximal member 26 to the distal member 24. To a certain extent, axially sloping (e.g. truncated conical) and circumferentially discontinuous walls, such as one or more circumferentially extending segment(s) interrupted by other features, can be used in alternate embodiments, instead of a cylindrical configuration.

The distal member 24 and the proximal member 26 can have features acting as axial stops, and such features can be considered to form part of the mating portions 34, 36. In the example illustrated, each one of the distal member 24 and the proximal member 26 have two such mating features. More specifically, the proximal member 26 has a first transversally oriented face 40 extending radially inwardly from an axially distal end of the radially outer-facing cylindrical wall, and forming a first, radially-inner stop, and a second transversally oriented face 38 extending annularly radially outwardly from an axially proximal end of the radially outer-facing cylindrical wall, forming a radially outer shoulder or stop. Matingly, the distal member 24 has a first transversally oriented face 44 extending radially inwardly from an axially distal end of the radially inner-facing cylindrical wall, forming a radially inner shoulder or stop, and a second transversally oriented face 46 extending annularly, radially outwardly from an axially proximal end of the radially inner-facing cylindrical wall, forming a radially outer shoulder or stop. When engaging the proximal member 26 into the distal member 24, the radially outer stops 46, 38 can ultimately come into abutment with one another and prevent further penetration, and the radially inner stops 44, 40 can also, and redundantly, come into abutment with one another and prevent further penetration. The radially outer stops 46, 38 can be more practical to this end as they are visually accessible to the assembler, and seeing that they have come into abutment with one another can provide visual confirmation of correct relative axial alignment, whereas the radially inner stops 44, 40 may be blind to the assembler when the central jet assembly 22 is in position. It will be understood that in alternate embodiment, only one such axial stop can be used instead of two, or more than two, and in some other embodiments, axial stops may be omitted altogether.

The mating portions 36, 34 can be configured in a manner to allow a certain degree of variation in the circumferential alignment of the distal member and proximal member. For instance, in the illustrated embodiment, the mating portions are continuous circumferentially, and when making abstraction of all other features, could accommodate any relative circumferential orientation to one another. As we will soon see, however, in this embodiment, other components come into play once past a certain degree of axial engagement, and can serve to lock the relative circumferential alignment. Embodiments in which the mating portions can allow some degree of relative rotation before being secured can raise a question of how to achieve correct circumferential alignment of the fluid conduit portion (s) in the proximal member with the corresponding fluid conduit portion(s) in the distal member in a manner to ensure that the fluid conduit network's configuration is correct once assembled.

A first consideration to take into account in circumferential alignment, is of providing a non-leaking fluid connection between the corresponding portions of the fluid conduit which are meant to communicate with one another. Indeed, in an theoretical scenario where a direct fluid connection is to be established between a small diameter outlet port formed in the proximal member and a small diameter inlet port formed in the distal member, even a minor circumferential misalignment between the two components could lead to a restriction at the interface between the two, and a substantial flow disruption. To a certain extent, such an issue can be alleviated by designing the mating portions with some form of permissive interface between the two ports, such as a third, interconnecting fluid conduit portion which would be circumferentially broader than the ports, thus allowing some degree of misalignment to be tolerated without a significant loss of flow restriction. Such an interconnecting fluid conduit can be formed by a spacing between corresponding surfaces of the distal member and proximal member when fully engaged. In one theoretical example, forming a broader bore extending concentrically to a certain depth in both the inlet and the outlet can be used to form such an interconnecting conduit area, as the broader diameter of the bore can then provide some degree of tolerance to misalignment, which can perhaps be determined to be roughly equivalent to the different in radius between the bore and the corresponding inlet or outlet. Another example would be to have corresponding portions of the distal member and/or proximal member in the vicinity of the inlet and/or outlet form some form of arc-shaped, or annular passage extending circumferentially from the inlet and/or outlet to a certain distance in one or both circumferential directions.

The embodiment presented in FIG. 3 presents an example of a fuel nozzle 120 having an third, interconnecting, fully annular conduit 133 which we will now explore. Indeed, using an annular conduit 133, which can be referred to as an annular gallery, in the mating region between the distal member 126 and the proximal member 124, can act as a manifold or plenum between a number of fuel conduits 150 in the proximal member 126, and a number of fuel conduits 152 in the distal member 124, where pressure can stabilize before fluid is redistributed. Moreover, depending on the embodiment, the number of conduits 152, 150 may not be equal in the proximal and distal members 124, 126. For instance, the fuel conduit(s) 150 in the proximal member 124 can be fewer supply conduit(s) having a broader diameter, whereas the conduits 152 in the distal member 124 can be a larger number of delivery conduits having a smaller diameter.

One thing to take into consideration in designing a circumferentially broader interface to form a misalignment tolerant connection between two conduit portions 150, 152, is the fuel velocity gradients within the interface during operation. Indeed, coking tends to occur when the fuel reaches a certain temperature. The fuel nozzle typically receives intense heat from the combustion chamber. The fuel typically arrives into the proximal member 126, 26 relatively cool, at the point most distant from the combustion chamber heat, and picks up heat from the fuel nozzle 20, 120 as it circulates across the nozzle towards the tip. In so doing, the fuel cools the nozzle 20, 120, simultaneously increasing in temperature. When the fuel is circulating in a small diameter conduit, it circulates relatively quickly, which, to a certain extent, limits the amount of temperature rise, and also favors the continuous introduction of new, cool fuel, which can prevent the walls of the fuel conduit from exceeding a temperature which would induce coking. The context of a circumferentially broader connecting interface can somewhat complexify the fuel flow dynamics, and may create regions where the fuel replacement rate is low, and where fuel temperature can therefore rise to the point of coking.

To illustrate possible coking behaviors, let us now consider two example configurations using an annular gallery configuration such as the one of FIG. 3. If the amount of proximal member outlets 154 corresponds to the amount of distal member inlets 156, it may be preferable for the inlets 156 and outlets 154 to be as perfectly aligned with one another as possible, so as to reach the greatest fuel flow in the critical passage area and ensure that coking does not occur there and obstruct the flow, even if it means that the fuel in the remainder of the gallery will eventually coke and close the circumferential passages between the interfaces. Circumferential offsetting, or "clocking", from this perfect alignment condition may cause reduction in fuel velocity, due to factors such as Bernouilli's principle and turbulence, and hence present a risk of coking in an undesirable area, which it is preferred to keep unrestricted. In another example, if there are less outlets 154 than inlets 156, the ideal scheme can be to perfectly misalign the inlets from the outlets, i.e. positioning the inlets 154 exactly between two outlets 156, so that each inlet may share its fuel throughput evenly with the two outlets 156, along corresponding, opposite branches of the fuel gallery. In such as configuration, the speed of fuel can be the same in both branches. Misalignment, or "clocking", away from that configuration can lead to a shorter branch on one side than the other, different velocities, and hence a risk of coking in the branch where the fuel speed is slower.

One solution to such fluid dynamics issues which can lead to coking, is to use circumferential stops to ensure perfect/ design alignment.

Returning to the embodiment shown in FIG. 2, in this embodiment, circumferential stops 58, 60 are incorporated as part of the geometry forming the connecting conduit 48 itself, internally to the mating portions 36, 34. More specifically, the mating inner and outer annular wall engagement are radially outwardly spaced apart from the connecting passage 48, and make the connecting passage a "blind assembly", in the sense that the connecting conduit 48 is not visible from the outside when the distal and proximal members 24, 26 are engaged. FIG. 2D presents a "negative" image showing the conduits 50, 48, 52, when the distal member 24 is engaged with the proximal member 26, as solids, and the solid areas as void. It can be seen that in this embodiment, the proximal member 26 has two internal first fluid conduits 50 leading to the connection area, the distal member 24 has four second conduit members 52 extending from the connection area to the tip of the fuel nozzle 20, and once engaged, mating features of the proximal member 26 and of the distal member 24 form two generally arc-shaped, circumferentially discontinuous, connecting conduits 48. Each one of the connecting conduits 48 connects one of the first fluid conduits 50 to two corresponding second fluid conduits 52, and therefore act as a manifold. The two connecting conduits 48 are discrete, separate from one another.

The expression "generally arc-shaped" is an abstraction of many of the details of the embodiment. Indeed, the connecting conduits can be seen to generally include two branches 62, 64, including a first branch 62 extending generally in a first circumferential direction 66, but also axially, away from the first fluid conduit outlet 54 to one of the connected second fluid conduits 52, and the other branch 64 extends in the second circumferential direction 68, and also axially, to the other second fluid conduits 52. The connecting conduit 48 is generally shaped by the spacing which exists, when the distal member 24 is engaged with the proximal member 26, between a female feature 70 formed here in the distal member 24 and a male feature 72 formed in the proximal member 26, the male feature 72 being smaller than the female feature 74 in a manner to allow a specifically designed connecting conduit 48 in the form of the spacing therebetween when engaged, and also between radially-opposite walls of the female feature 74. This is but one example and alternate embodiments can have various geometrical connecting conduit configurations, such as using a female member incorporated to the proximal member instead of the distal member, two female members instead of male-female members, forming connecting conduits having not only circumferential and axial portions, but also radial portions, etc.

This being said, it will be understood that the design choice of having a male-female configuration for features forming the connecting conduits can be an interesting one in some embodiments, as it allows to incorporate a circumferential stop mechanism into the male-female feature engagement itself. Indeed, in this embodiment, four male features 72 protrude from a transversally oriented annular flat face 40 of the proximal member 26, a pair of which are associated to each one of the first fluid conduit outlets 50 and to each one of the connecting conduits 48. The two male features 72 of each pair each have a planar face extending radially and axially, facing away from the other male feature, and acting as a stop 58. Accordingly, when engaging the distal member 24 with the proximal member 26, a first step can be to engage the cylindrical wall of the proximal member 26 inside the cylindrical bore of the distal member 24, which acts in a manner to ensure concentric alignment between the two members 24, 26. The proximal member 26 can then be slid axially into the cylindrical bore of the distal member 24. If the male features 72 are not perfectly aligned with the female features 70, they can be configured to come into abutment against an annular face 44 forming the end of the cylindrical bore, leaving a gap between the edge 46 of the distal member 24 and the shoulder 38 of the proximal member 26, which shows the assembler that the distal member 24 and proximal member 26 are not perfectly engaged. The assembler can then rotate/clock the distal member 24 relative to the proximal member 26 until he/she reaches the relative circumferential orientation where he/she feels that further axial movement is possible. In the illustrated configuration, there are only two relative positions, interspaced by 180 degrees, in which such further axial movement will be possible, and both are correct relative positions, corresponding to a configuration where both pairs of male features 72 can penetrate a corresponding one of the female members 70. The assembler can then continue the axial movement until the edge 46 of the distal member 24 comes into abutment with the shoulder 38 of the proximal member 26, at which point the proximal member 26 is known to be fully engaged with the distal member 24. In the fully engaged position, the circumferentially-directed faces 58 of the male features 72 are immediately adjacent oppositely circumferentially-directed faces 60 of the female features 70, and come into immediate abutment therewith, preventing any significant rotation away from clocked alignment, if rotary force is applied. In other embodiments, it can be preferred to form male-female features forming circumferential stops which are distinct from the features forming the connecting conduit, or another form of circumferential stop mechanism, for instance.

In some embodiments, it is difficult to make a small gallery due to machining tolerances. Changing the gallery into a lug/standoff (male member) and slot/pockets (female member) system can facilitate the machining of a small passage to replace the gallery, and can allow for clocking of the feeder holes with respect to the exit holes to an optimal position for heat transfer and fuel distribution. The slot and lug design cam ensures that the pieces can only be assembled together in one way. The lugs and slots can fix the alignment of the feeder holes to the exit holes, ensuring that the feeder holes empty into a spot between the exit holes. This can improve flow uniformity through each exit hole, and eliminate the need for special assembly fixtures to ensure proper clocking. Additionally, this can eliminate dead zones in the passage due to alignment issues.

In the embodiment presented in FIG. 2, it will be noted that the third conduit portions 48 are each symmetrical relative to radial/axial plane of symmetry extending across the outlets 54 of the first conduits 50. This can simplify the balancing of the flow in each branch.

Turning now back to FIG. 3, it will be understood that in alternate embodiments, the stops can be provided separately from the features forming the third conduit(s). For example, the fuel nozzle 120 can have a first stop 170 provided as a face of a protrusion made integral to the distal member 124, and a second stop 172 provided as a face of a protrusion made integral to the proximal member 126. In this embodiment, both the first stop 170 and the second stop 172 are radially external to the fuel nozzle, and are radially outwardly offset from the conduits 152, 154, 148. They are also provided as entirely distinct features from the features forming the conduits 152, 154, 148. Such an embodiment can be assembled by positioning the distal member and proximal member in axial alignment but at an arbitrary circumferential relative orientation, engaging them axially, and rotating them once they have been axially engaged until the stops come into abutment.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fuel nozzle comprising:
a proximal member having a first mating portion defined around an assembly axis, a first fluid conduit internal to the proximal member and spaced apart from the assembly axis, and a first stop facing a first circumferential direction relative to the assembly axis;
a distal member having a second mating portion configured for axial engagement with the first mating portion along the assembly axis, a second stop facing a second circumferential direction relative to the assembly axis, the second circumferential direction opposite the first circumferential direction and configured to abut against the first stop when the distal member and proximal member are axially engaged to one another in a predetermined relative circumferential alignment, a second fluid conduit internal to the distal member and spaced apart from the assembly axis, the second fluid conduit being in fluid flow communication with the first fluid conduit internally to the fuel nozzle when the second stop abuts the first stop.

2. The fuel nozzle of claim 1 wherein a third fluid conduit forms a fluid flow connection between the second fluid conduit and the first fluid conduit when the second stop abuts the first stop, the third fluid conduit formed at least partially by a female member formed in one of the proximal member and the distal member.

3. The fuel nozzle of claim 2 wherein the third fluid conduit is formed from engagement between at least one male member formed in one of the proximal member and the distal member, the female member formed in the other one of the proximal member and the distal member.

4. The fuel nozzle of claim 3 wherein the male member bears a corresponding one of the first stop and second stop, and the female member bears the other one of the first stop and the second stop.

5. The fuel nozzle of claim 2 wherein the third fluid conduit has an arc shape.

6. The fuel nozzle of claim 2 wherein the third fluid conduit has a circumferentially extending portion which slopes axially.

7. The fuel nozzle of claim 2 wherein the first and second stops are positioned at a circumferential end of the third fluid conduit.

8. The fuel nozzle of claim 1 wherein both the proximal member and the distal member have annular geometries centered around the assembly axis.

9. The fuel nozzle of claim 1 wherein the one of the first mating member and the second mating member has a cylindrical radially outer surface extending axially from a radially outward annular shoulder, and the other one of the first mating member and the second mating member has a cylindrically radially inner surface extending axially from a radially inward annular shoulder, the first mating member and the second mating member fitting snugly into one another along the axial orientation until the radially outward annular shoulder engages the radially inward annular shoulder.

10. The fuel nozzle of claim 9 wherein the second fluid conduit and the first fluid conduit are radially inwardly offset from the cylindrical radially outer surface and cylindrical radially inner surface engagement.

11. The fuel nozzle of claim 1 wherein the first fluid conduit is in fluid flow communication with at least two second fluid conduits via corresponding third conduit branches when the second stop abuts the first stop.

12. The fuel nozzle of claim 11 wherein the third conduit branches are of equal length.

13. A gas turbine engine having an annular gas path extending subsequently across, a compressor stage, a combustion stage, and a turbine stage, the combustion stage including a plurality of circumferentially interspaced combustion chamber units, each combustion chamber unit having a fuel nozzle, at least one of said fuel nozzles having a proximal member having a first mating portion defined around an assembly axis, a first fluid conduit internal to the proximal member and spaced apart from the assembly axis, and a first stop facing a first circumferential direction relative to the assembly axis; a distal member having a second mating portion configured for axial engagement with the first mating portion along the assembly axis, a second stop facing a second circumferential direction relative to the assembly axis, the second circumferential direction opposite the first circumferential direction and configured to abut against the first stop when the distal member and proximal member are axially engaged to one another in a predetermined relative circumferential alignment, a second fluid conduit internal to the distal member and spaced apart from the assembly axis, the second fluid conduit being in fluid flow communication with the first fluid conduit internally to the fuel nozzle when the second stop abuts the first stop.

14. The gas turbine engine of claim 13 wherein a third fluid conduit forms a fluid flow connection between the second fluid conduit and the first fluid conduit when the second stop abuts the first stop, the third fluid conduit formed at least partially by a female member formed in one of the proximal member and the distal member.

15. The gas turbine engine of claim 13 wherein the one of the first mating member and the second mating member has a cylindrical radially outer surface extending axially from a radially outward annular shoulder, and the other one of the first mating member and the second mating member has a cylindrically radially inner surface extending axially from a radially inward annular shoulder, the first mating member and the second mating member fitting snugly into one another along the axial orientation until the radially outward annular shoulder engages the radially inward annular shoulder.

16. The gas turbine engine of claim 13 wherein the first fluid conduit is in fluid flow communication with at least two second fluid conduits via corresponding third conduit branches when the second stop abuts the first stop.

\* \* \* \* \*